United States Patent
Cullen et al.

(10) Patent No.: US 7,372,676 B2
(45) Date of Patent: May 13, 2008

(54) MOTOR COIL-SHORTING DETECTING UNIT

(75) Inventors: John J A Cullen, Derby (GB); George Antonopoulos, Athens (GR)

(73) Assignee: Rolls-Royce plc, London (GB)

( * ) Notice: Subject to any disclaimer, the term of this patent is extended or adjusted under 35 U.S.C. 154(b) by 0 days.

(21) Appl. No.: 11/299,685

(22) Filed: Dec. 13, 2005

(65) Prior Publication Data

US 2006/0087776 A1 Apr. 27, 2006

Related U.S. Application Data

(63) Continuation of application No. PCT/GB2004/002601, filed on Jun. 18, 2004.

(51) Int. Cl.
*F21V 7/04* (2006.01)
*H02H 5/04* (2006.01)
*H02H 7/08* (2006.01)

(52) U.S. Cl. .............................. 361/31; 361/23; 361/24; 361/30

(58) Field of Classification Search .................... 361/31
See application file for complete search history.

(56) References Cited

U.S. PATENT DOCUMENTS 5,223,775 A 6/1993 Mongeau
5,612,629 A 3/1997 Mullin
6,265,891 B1 7/2001 Yamada
6,750,576 B2 * 6/2004 Ehrhart et al. ............ 310/68 R
2001/0035688 A1 * 11/2001 Sawada et al. ........... 310/68 C
2002/0163820 A1 11/2002 Nakamura

FOREIGN PATENT DOCUMENTS

EP 1 317 057 A 6/2003

* cited by examiner

*Primary Examiner*—Michael Sherry
*Assistant Examiner*—Dharti H Patel
(74) *Attorney, Agent, or Firm*—W. Warren Taltavull; Manelli Denison & Selter PLLC

(57) ABSTRACT

In order to be acceptable for safety critical applications, it is necessary for an electrical machine to allow continued operation despite an electrical short circuit in one of the operational phases of that electrical machine. It will be appreciated that an electrical short circuit creates excessive electrical current through the short circuit with significant heating and other detrimental effects. However, the electrical machine can operate with one operational phase disabled. In such circumstances, the present invention incorporates means for determining an electrical short circuit has occurred and then injects an electrical current approximately equal to or greater than the rated electrical current. In such circumstances, the operational phase or coil 4, 24, 34 is effectively protected despite the electrical short circuit and hence the electrical machine can continue to operate.

10 Claims, 3 Drawing Sheets

MOTOR COIL-SHORTING DETECTING UNIT

This is a continuation of International Appln. No. designating the U.S. PCT/GB2004/002601 filed Jun. 18, 2004.

FIELD OF THE INVENTION

The present invention relates to electrical machines and more particularly to protection against damage arising from shorted turns on coils in such machines.

BACKGROUND OF THE INVENTION

Permanent magnet electrical machines whether used as motors or generators are relied upon in safety critical situations. Thus, the electrical machine must continue to operate despite shorted turns or coils in the armature winding of the machine. Typically, these permanent magnet electrical machines have modular windings in which there is physical and electromagnetic separation of coils wound around alternate armature teeth. It is this separation of the armature coils which leads to the term modular winding. For truly fault tolerant electrical machines, there is a general requirement for an armature reactance of around 1.0 per unit and so this requires a suitable modular power converter, e.g. H-bridge converter unit for each phase.

With a fault tolerant permanent magnet machine, it will be understood that the machine can continue to operate or tolerate an open circuit or short circuit of one phase whilst the remaining phases can continue at or near normal rated power. In such circumstances, the electrical machine can continue to function until it is possible to repair or replace it.

In addition to short circuit failures at electrical machine terminals, it is also desirable that permanent magnet machines with modular windings are tolerant to short circuits in individual turns. However, in order to be so tolerant, it has been suggested in the prior art that the turn-to-turn fault is recognised immediately using an appropriate intelligent monitoring system such that when recognised, the entire affected phase is short circuited. If recognition and short circuiting is not so performed, then the electrical current in the shorted turns will be excessively high and could jeopardise the entire winding immediately or compromise its reliability for future performance. In short, the shorted turns or the winding are isolated to protect the whole machine's ongoing operational integrity. Nevertheless, where there are few turns per winding coil, it will be appreciated that it may be difficult to use normal approaches to shorted turn protection in a fault tolerant electrical machine.

SUMMARY OF THE INVENTION

In accordance with the present invention, there is provided an electrical machine comprising a plurality of coils associated with an armature to provide a plurality of phases of operation upon relative rotation between the coils and a rotor, detection means for an electrical short circuit in at least one of said coils to determine a faulted turn and electrical current injection means whereby when an electrical short circuit is detected in the faulted turn, then an appropriate electrical current is injected into that coil to effectively protect that coil or part of that coil subject to an electrical short circuit in order to inhibit excessive electrical current flow through the faulted turn of the coil or other part of the coil.

Normally, the electrical machine is a permanent magnet motor or generator.

Typically, the injected electrical current has a phase angle which creates a field directly opposing the magnet flux to that of the magnets in the electrical machines to inhibit electrical current flow through the short circuit.

Typically, the electrical current is injected through terminals at each end of the coil subject to an electrical short circuit.

Possibly, the injected electrical current value is dependent upon the position within the coil at which the electrical short circuit occurs. Alternatively, a fixed injected electrical current value is determined for acceptable reduction of short circuit current flow into the coil.

Typically, the injected current will have a value approximately equal to or in excess of, the rated short circuit current for the coil or phase.

BRIEF DESCRIPTION OF THE DRAWINGS

An embodiment of the present invention will now be described by way of example only with reference to the accompanying drawings in which.

DETAILED DESCRIPTION OF THE INVENTION

Figure 1:
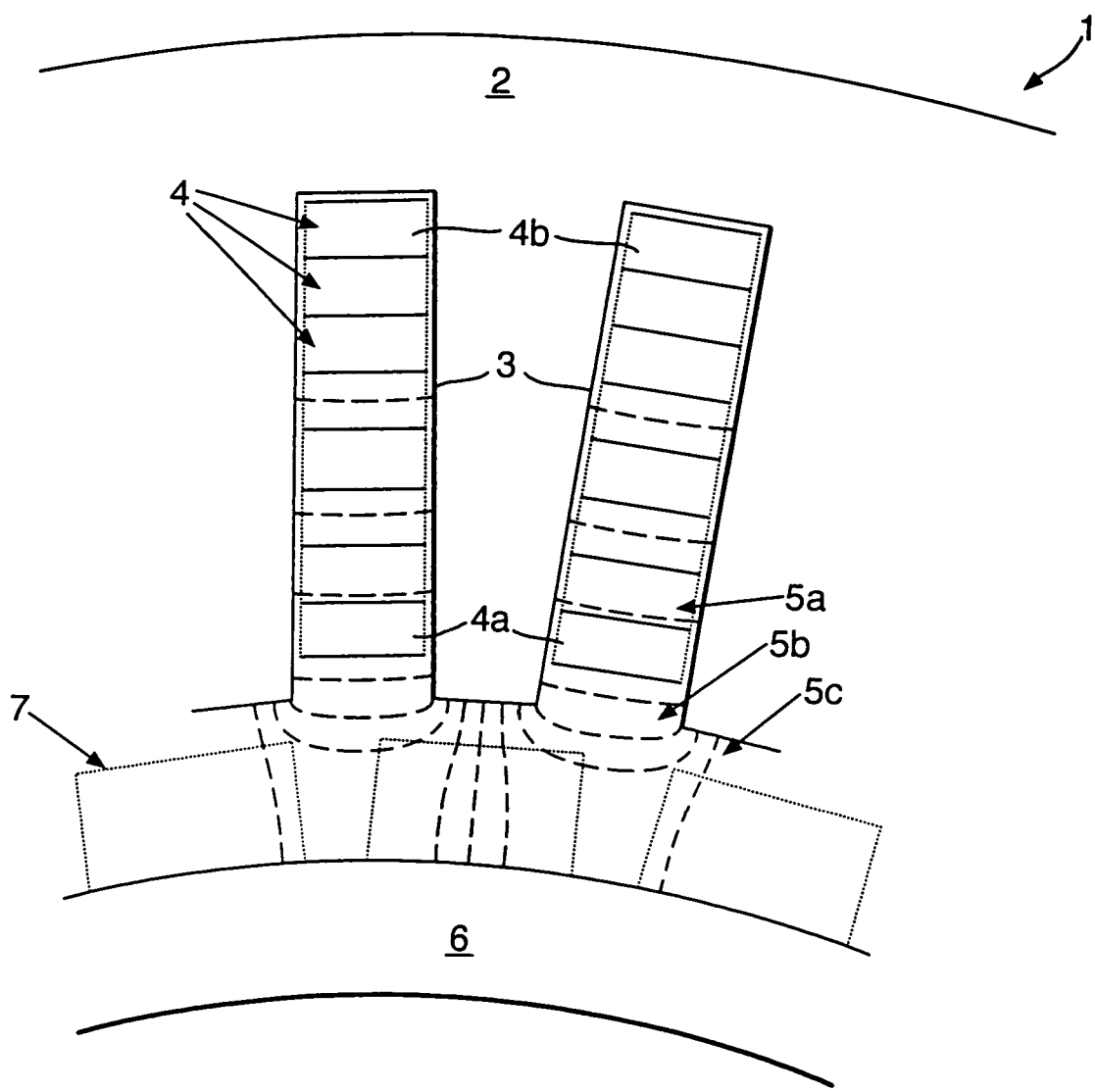
FIG. 1 is a schematic cross-section of part of an electrical machine in accordance with the present invention.

Referring to FIG. 1 providing a schematic cross-section of part of an electrical machine 1 in accordance with the present invention. Thus, the electrical machine 1 comprises a stator core 2 within which slots 3 are provided to accommodate coils 4 in the form of respective turns of rectangular section conductor usually, but not necessarily provided by drawn copper bars. The slots 3 are shown as open which is consistent with having a stiff bar coils 4 but it will also be understood that semi-closed slots could be provided within which the coils 4 are located. In FIG. 1, broken lines 5 illustrate magnetic flux paths which contribute to armature winding reactance. Thus, line 5a relates to armature slot leakage flux, line 5b relates to tooth leakage flux and line 5c relates to air gap flux across from the armature coil to a rotor 6 incorporating permanent magnets 7. It will be appreciated by appropriate phase flow of electrical current through the coil windings 4 and consequent magnetic flux 5 that rotation of the rotor 6 is achieved by interaction of the flux 5 with the flux of the magnets 7.

When there is a complete electrical short circuit of a coil 4 or a short circuit of a complete phase at the terminals, then the total armature flux linkage for the coil 4, that is to say adding together all the flux linkages 5 for each turn of the coil 4, is equal and opposite to the magnet flux linkage, ignoring the effect of resistance of coil 4. In such circumstances, the net or aggregate magnetic flux linkage of the short circuited coil and similarly the net voltage across the coil 4 will be zero. The electrical short circuit current is equal to the coil 4 electromotive force (EMF) induced by the moving magnets divided by the coil 4 reactance. This short circuit electrical current is known as and from here on will be referred to as a rated short circuit current of the coil 4 or phase.

If the electrical reactance for each coil 4 is 1.0 per unit then the rated short circuit current will be equal to the normal rated current of the machine through the coil 4. The phase angle of the rated short circuit current will be such that the peak current occurs when the magnets 7 are in alignment with the shorted coil 4 or phase. In such circumstances the coil 4 magnetic field opposes that of the magnet 7.

It will be understood that electrical short circuits may occur at a number of points and locations within a coil 4 or at the terminals of a phase. A short circuit protection arrangement needs to accommodate short circuits at all these points and locations.

If an electrical short circuit occurs at the turn 4a nearest the slot 3 opening, then the net voltage in the shorted turn 4a must be zero and the current in that turn 4a of the coil 4 will inevitably be very large. In any event, it will be much greater than the rated short circuit current. The current may be many times the rated short circuit current (e.g. about 8 times in FIG. 1). For information, an electrical short circuit may occur in the turns 4a near the slot 3 opening as a result of degradation or failure of the inter-turn electrical insulation between the turns 4. It is easily shown mathematically or by finite element analysis that the net flux linking that turn 4a is effectively zero. Thus, there is a large electrical current in that turn 4a producing a magnetic field that completely opposes the magnetic field such that there is effectively zero magnetic flux linkage with the rest of the coil.

Figure 2:
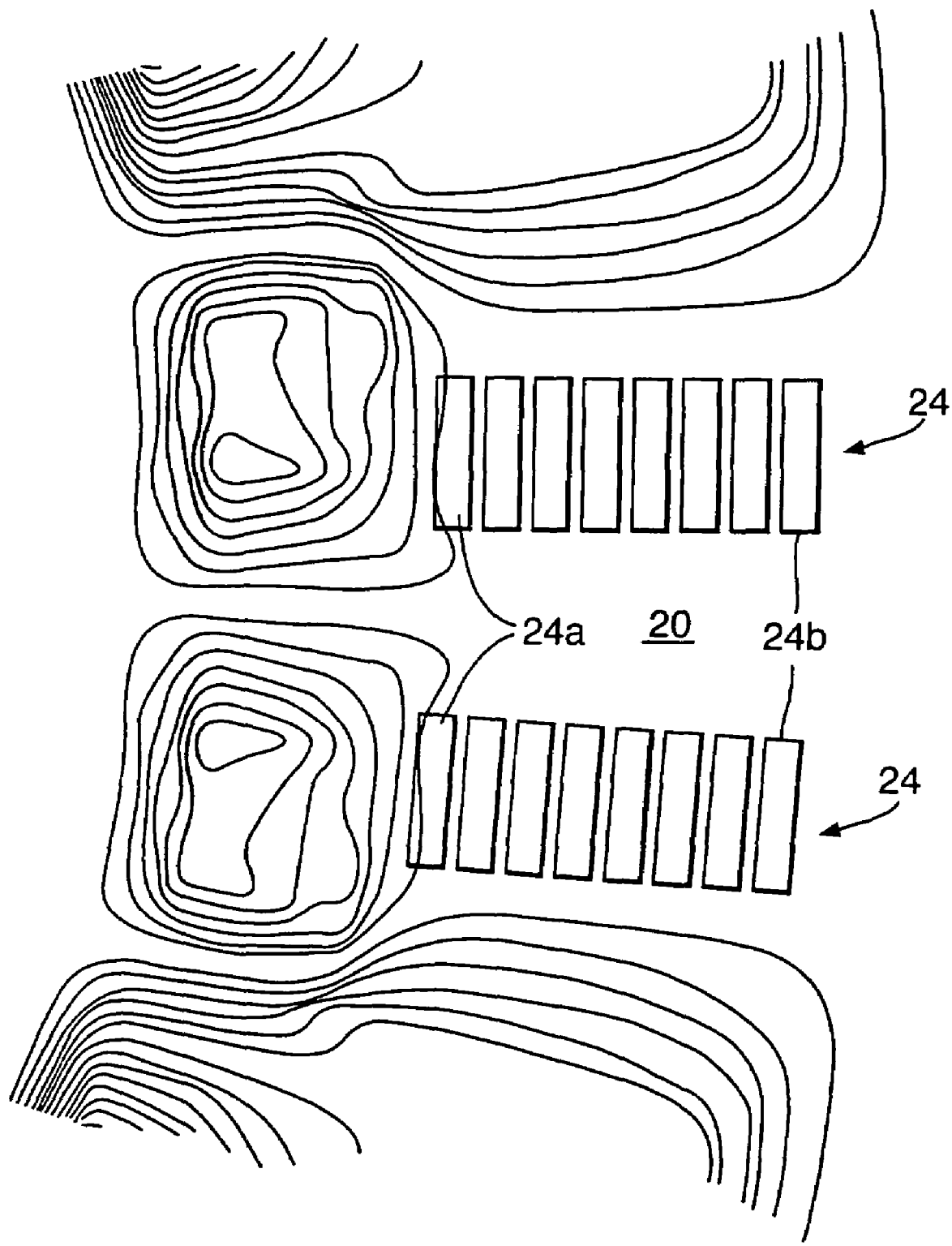
FIG. 2 is a schematic graphic representation illustrating flux density of a shorted or faulted turn within a coil and, FIG. 3 is a diagrammatic illustration of an electrical current injection arrangement for use within an electrical machine in accordance with the present invention.

FIG. 2 is a schematic graphic representation of a finite element magnetic flux distribution with electrically short circuited turn 24a within a coil winding 24 of an electrical machine. This turn 24a is nearest a slot opening (not shown) and demonstrates that there is almost no magnetic flux penetration into the rest of the tooth, that is to say area 20 depicted in FIG. 2. This situation is little changed if further turns of the coil winding 24 are also electrically shorted.

In accordance with the present invention, an electrical current is injected into the terminals of an operational phase within which a turn subject to an electrical short circuit in order to encourage a slot flux pattern similar to that of to a short circuit of a complete coil 24 or phase. In such circumstances, the required phase angle of the injected current needs to directly oppose the magnet flux. Normally, the magnitude of the injected electrical current is similar to or in excess of the rated short circuit current defined above. In any event, the shorted turn 4a, 24a current is effectively reduced whereby the electrical machine can continue to operate with little danger that excessive electrical current through the short circuited faulted turn will create further problems.

As indicated above, electrical short circuits can occur at a number of positions within coil 4 or phase. In accordance with the present invention, injected electrical current is provided by a converter module connected to each phase of the electrical machine. The electrical short circuit current will vary dependent upon the position of electrical short circuit within the coil 4, 24 or phase.

Ideally, the magnitude of the injected electrical current will depend upon the position of the particular shorted or faulted turn of the coil 4, 24. Thus, where possible the magnitude of the injected electrical current will be adjusted to minimise the overall heat dissipation of the electrically short circuited coil and avoid extreme heating of the shorted turn within the coil 4, 24.

It will be understood that in most circumstances, it will not be possible or practical in view of time or complexity to detect electrical short circuit position, that is whether it is at the first turn 4a, 24a nearest the slot 3 opening or turn 4b, 24b nearest to the slot 3 bottom or a turn at an intermediate position between them. In such circumstances, it is advisable simply to inject a short circuit current of a value which will reasonably reduce the electrical current in the electrically shorted turn of the coil 4, 24 and the rest of that coil regardless of the position of the electrical short circuit. In such circumstances, the electrical current magnitude in the electrically short circuited coil turn will be higher than desirable but still remain acceptable. In short, a fixed electrical current will be injected into the terminals of the faulted coil of phase to reduce the current in the shorted part of the coil or phase.

The fixed injected electrical current, in accordance with the present invention, will normally be determined through a finite element analysis of short circuit current at different positions in the coil. Thus, through such finite element analysis for particular geometries and coil details an appropriate compromise injected electrical current can be determined. In such circumstances, when sensors determine an electrical short circuit has occurred in one of the coils of the electrical machine, then a controller, typically in the form of a micro-processor will activate injection of the fixed electrical current into the terminals of the coil 4, 24 or the phase.

Figure 3:
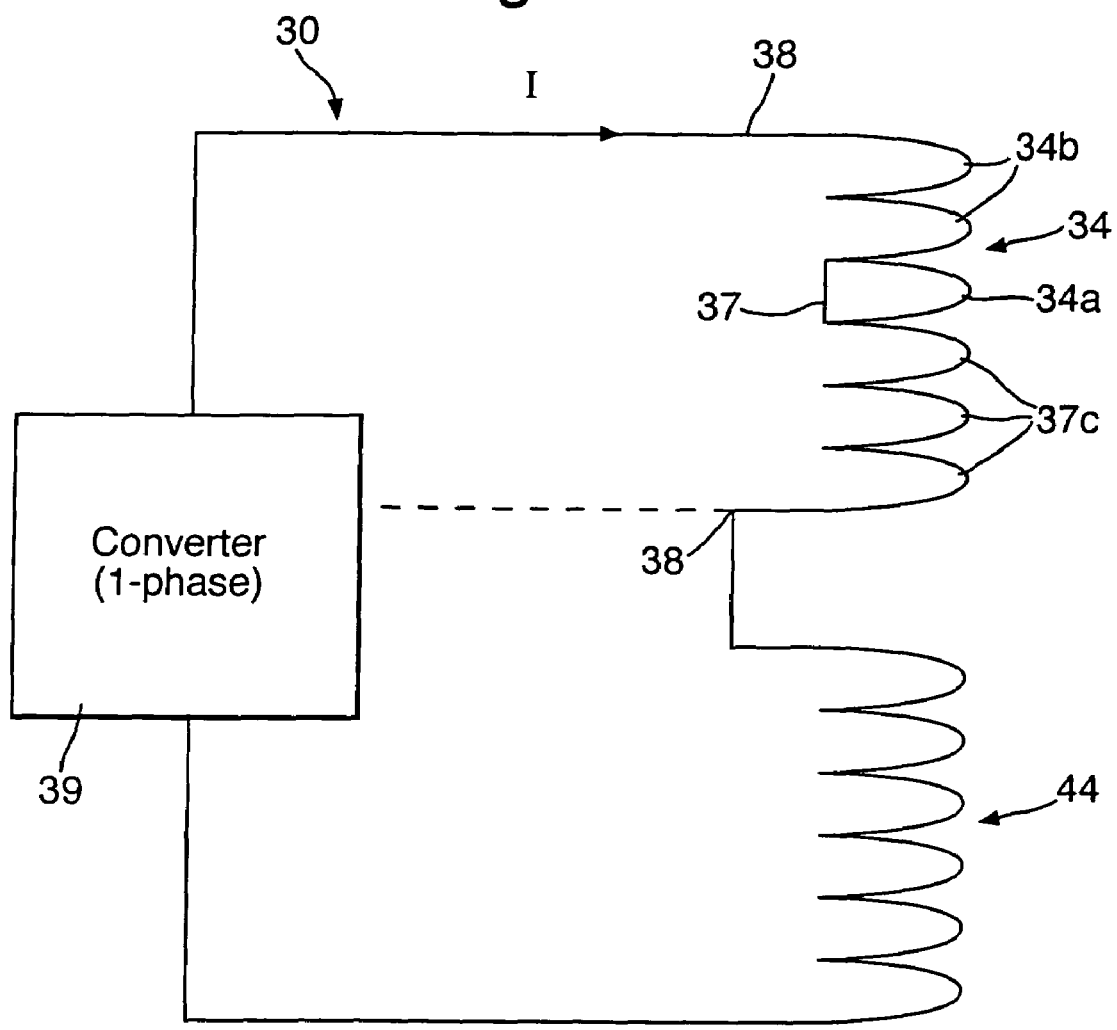

FIG. 3 illustrates through a schematic diagram an operational phase in which a turn 34a of a coil 34 is electrically short circuited. Thus, the operational phase 30 comprises an electrical circuit through which an electrical current I passes. The electrical circuit includes coil 34 and other coils symbolically shown as coil 44 but it will be appreciated that normally there will be a multitude of such coils 44 in the circuit. Flow of electrical current I is cyclical through the coils 34, 44 in order to produce magnetic flux which in turn drives through association with the magnets 7 rotation of the rotor 6 (FIG. 1) or vice versa creates electrical current in the coils 34, 44 when that rotor is driven. In accordance with the present invention, as indicated turn 34a of the coil 34 has an electrical short circuit 37 so that in use an excessive electrical current will pass through that turn 34a whilst turns 34b, 34c are screened magnetically by the short circuit 37. In order to prevent this potentially dangerous situation in accordance with the present invention, an electrical current is injected into the terminals of the coil 34 of phase 30 in order to effectively avoid damage to the coil 34 in the phase 30. As indicated previously, the injected electrical current ideally is matched to the position of the electrical short circuit 37 or may comprise a fixed injected electrical current in order to provide a reasonable reduction in the electrical current through the short circuit so as to prevent dangerous overheating and degradation of the electrical machine.

Returning to FIG. 1 it can be seen that eight conductors form the turns of the coil 4 within each slot 3. Approximately 40% of the armature core reactance is associated with cross slot magnetic flux in the region of the coil 4. It has been found by injection of an electrical current which is approximately 1.4 times the rated short circuit current that there is sufficient protection in accordance with the present invention. Nevertheless, with proportionally reduced cross slot magnetic flux there will be a reduction in armature core reactance and so the necessary or ideal injected electrical current magnitude may also be similarly reduced.

It will be appreciated that a converter 39 (FIG. 3) supplies the electrical current through the circuit of the phase 30. As indicated previously, the reactance of a typical fault tolerant electrical machine is 1.0 per unit. However, as it is now necessary to inject an electrical current which may be greater, than the rated electrical current, it will be understood that this converter 39 will need to be able to supply this higher injected current. Nevertheless, this is typically within acceptable design parameters for such converters 39.

By injecting an appropriate electrical current in accordance with the present invention, it will be appreciated that the magnetic field created in the unfaulted turns acts to inhibit excessive electrical current flow through the faulted turns. By injecting the appropriate electrical current into the terminals 38 of the faulted phase at the appropriate point in the phase cycle, it will be understood that the current in the short circuited turn is effectively reduced such that the electrical machine can continue to operate with the other phases. In such circumstances, the electrical machine incorporating the rotor 6 and stator core 2 can continue to operate despite the electrical short circuit in one coil and at least until the electrical machine can be repaired or replaced. An electrical machine in accordance with the present invention is more reliable and therefore acceptable in safety critical applications.

Although described with regard to eight coil turns, it will be appreciated that electrical machines can be constructed with different numbers of electrically conducting turns and similarly, the number and distribution of coil modules and/or magnets 7 upon the rotor 6 can be varied for necessary operational requirements.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. An electrical machine comprising a plurality of coils associated with an armature to provide a plurality of phases of operation upon relative rotation between the coils and a rotor, each operational phase comprising an electrical circuit, each electrical circuit including a plurality of coils and a converter to supply electrical current through the electrical circuit, characterised by detection means for an electrical short circuit in at least one of said coils to determine a faulted turn and electrical current injection means whereby when an electrical short circuit is detected in the faulted turn, then an electrical current is injected into the electrical circuit of the operational phase containing that coil to effectively protect that coil or at least part of that coil subject to an electrical short circuit in order to inhibit excessive electrical current flow through the faulted turn of the coil.

2. An electrical machine comprising a plurality of coils associated with an armature to provide a plurality of phases of operation upon relative rotation between the coils and a rotor, each operational phase comprising an electrical circuit, each electrical circuit including a plurality of coils and a converter to supply electrical current through the electrical circuit, characterised by detection means for an electrical short circuit in at least one of said coils to determine a faulted turn and electrical current injection means whereby when an electrical short circuit is detected in the faulted turn, then an electrical current is injected into the electrical circuit of the operational phase containing that coil to effectively protect that coil or part of that coil subject to an electrical short circuit in order to inhibit excessive electrical current flow through the faulted turn of the coil or other part of the coil, wherein the injected electrical current has a phase angle which creates a field directly opposing the magnetic flux to that of the magnets in the electrical machine to inhibit electrical current flow through the short circuit.

3. An electrical machine as claimed in claim 1, wherein the electrical current is injected through terminals of the operational phase containing the coil subject to an electrical short circuit.

4. An electrical machine as claimed in claim 1, wherein the injected electrical current value is dependent upon the position within the coil at which the electrical short circuit occurs.

5. An electrical machine as claimed in claim 1, wherein a fixed injected electrical current value is determined for acceptable reduction of short circuit current flow into the coil.

6. An electrical machine as claimed in claim 1, wherein the injected current will have a value approximately equal to or in excess of the rated short circuit current for the coil or phase.

7. An electrical machine comprising a plurality of coils associated with an armature to provide a plurality of phases of operation upon relative rotation between the coils and a rotor, each operational phase comprising an electrical circuit, each electrical circuit including a plurality of coils and a converter to supply electrical current through the electrical circuit, characterised by detection means for an electrical short circuit in at least one of said coils to determine a faulted turn and electrical current injection means whereby when an electrical short circuit is detected in the faulted turn, then an electrical current is injected into the electrical circuit of the operational phase containing that coil to effectively protect that coil or part of that coil subject to an electrical short circuit in order to inhibit excessive electrical current flow through the faulted turn of the coil or other part of the coil wherein the injected current will have a value approximately one of: equal to, 1.3 times, or in excess of the rated short circuit current for the coil or phase.

8. An electrical machine as claimed in claim 7, wherein the injected current has 1.4 times the rated short circuit current for the coil or phase.

9. An electrical machine as claimed in claim 1, wherein the detection means is for an electrical short circuit in any or all the coils of the machine.

10. An electrical machine as claimed in claim 1, wherein the electrical machine is a permanent magnet electrical machine used as an electric motor and/or an electricity generator.

* * * * *